(12) United States Patent
Barberan Latorre

(10) Patent No.: US 12,275,033 B2
(45) Date of Patent: Apr. 15, 2025

(54) SYSTEM FOR COATING A CONTINUOUS SHEET

(71) Applicant: Jesus Francisco Barberan Latorre, Castelldefels (ES)

(72) Inventor: Jesus Francisco Barberan Latorre, Castelldefels (ES)

( * ) Notice: Subject to any disclaimer, the term of this patent is extended or adjusted under 35 U.S.C. 154(b) by 227 days.

(21) Appl. No.: 18/000,529

(22) PCT Filed: Jun. 4, 2021

(86) PCT No.: PCT/ES2021/070410
§ 371 (c)(1),
(2) Date: Dec. 2, 2022

(87) PCT Pub. No.: WO2021/260240
PCT Pub. Date: Dec. 30, 2021

(65) Prior Publication Data
US 2023/0226569 A1    Jul. 20, 2023

(30) Foreign Application Priority Data

Jun. 26, 2020 (ES) .................................. P202030644

(51) Int. Cl.
*B05C 1/08* (2006.01)
*B27D 5/00* (2006.01)

(52) U.S. Cl.
CPC ............ *B05C 1/083* (2013.01); *B05C 1/0834* (2013.01); *B27D 5/003* (2013.01)

(58) Field of Classification Search
None
See application file for complete search history.

(56) References Cited

U.S. PATENT DOCUMENTS 2,995,469 A * 8/1961 Le Claire ............... G03D 5/003
  118/103
3,508,523 A * 4/1970 De Meerleer ......... B05C 1/0865
  118/302

(Continued)

FOREIGN PATENT DOCUMENTS

CN        201753456      *    6/2020    ............... B05C 1/08
CN        210753456 U         6/2020

(Continued)

OTHER PUBLICATIONS

International Search Report and Written Opinion for Corresponding International Application No. PCT/ES2021/070410, 10 Pages, Sep. 22, 2021.

*Primary Examiner* — Jethro M. Pence
(74) *Attorney, Agent, or Firm* — LUCAS & MERCANTI, LLP

(57) ABSTRACT

A system for coating a continuous sheet (1), having an application roller (10) for applying a coating on the sheet (1) when the sheet (1) is pressed against the application roller (10) by an application pressure element (11), a smoothing roller (20) for smoothing the coating applied on the sheet (1) by contact of the smoothing roller (20) with the coating when the sheet (1) is pressed against the smoothing roller (20) by a smoothing pressure element (21), the application (11) and smoothing pressure elements (21) being independently movable in order to press the sheet (1).

7 Claims, 4 Drawing Sheets

(56) References Cited

U.S. PATENT DOCUMENTS

| | | | | |
|---|---|---|---|---|
| 4,882,005 | A * | 11/1989 | Thompson | B31F 1/2813 |
| | | | | 118/259 |
| 5,518,569 | A * | 5/1996 | Achilles | B32B 38/1825 |
| | | | | 156/355 |
| 6,562,407 | B1 * | 5/2003 | Bonnebat | C23C 2/22 |
| | | | | 427/457 |
| 2005/0129854 | A1 * | 6/2005 | Damrau | D21H 25/08 |
| | | | | 427/428.01 |
| 2006/0049065 | A1 * | 3/2006 | Chevalier | B31B 50/00 |
| | | | | 118/123 |
| 2017/0282206 | A1 | 10/2017 | Kobayashi et al. | |
| 2021/0156064 | A1 * | 5/2021 | Nam | D06P 1/0036 |

FOREIGN PATENT DOCUMENTS

| | | |
|---|---|---|
| EP | 0919665 A2 | 6/1999 |
| EP | 2123453 A2 | 11/2009 |
| ES | 2394833 A1 | 2/2013 |

* cited by examiner

SYSTEM FOR COATING A CONTINUOUS SHEET

CROSS REFERENCE TO RELATED APPLICATION

This Application is a 371 of PCT/ES2021/070410, filed on Jun. 4, 2021 which claims the benefit of Spanish Patent Application No. P202030644, filed on Jun. 26, 2020, each of which are incorporated herein by reference.

TECHNICAL FIELD

The present invention relates to the roller application of a coating product to a sheet or laminar material in a continuous process. The invention is especially related to the preparation of the continuous sheet for coating component parts of furniture, such as panels or profiles, by means of the use of a glue or adhesive as a coating product.

STATE OF THE ART

Currently, roller application systems for applying a coating or layer of coating product, such as a glue or adhesive, to a continuous sheet are widely known. In these roller application systems, an application roller applies a coating on the sheet when the sheet is pressed against the application roller by an application pressure element in the transfer area of the coating product.

By means of these roller application systems it is possible to achieve a uniform distribution of the coating on the sheet. This is useful for gluing applications, wherein the coating product applied to the sheet is a glue or adhesive, since it enables defects to be eliminated which may appear when fastening the sheet on the base part as a consequence of the applied differences in glue mass.

For the so-called high-gloss coatings, wherein high-gloss sheets are used, in other words, made of materials the surface gloss of which resembles that of a mirror, or in transparent coatings, wherein transparent sheets are used, any minor defect can be seen more easily for which reason the uniform application of glue is especially relevant. Patent document ES2394833 describes a roller application system for applying glue to a continuous sheet for high-gloss applications.

In view of the currently existing known solutions, the object of the present invention is to provide a system for coating a continuous sheet which enables a uniform coating to be obtained in an improved manner, with practical utility especially for high-gloss, transparent or similar coatings, wherein due to the features thereof they make it possible to easily see application defects.

OBJECT OF THE INVENTION

In order to meet this objective and solve the technical problems discussed so far, in addition to providing additional advantages which can be derived later, the present invention relates to a system for coating a continuous sheet comprising an application roller for applying a coating on the sheet when the sheet is pressed against the applicator roller by an application pressure element.

Additionally, the coating system according to the invention comprises a smoothing roller for smoothing the coating applied on the sheet by contact of the smoothing roller with the coating when the sheet is pressed against the smoothing roller by a smoothing pressure element.

This successive arrangement of the application roller and the smoothing roller makes it possible that as soon as the coating is deposited by the coating roller on the continuous sheet, the smoothing roller provides a greater required uniformity to the applied coating.

According to the invention, the application and smoothing pressure elements are independently movable in order to press the sheet, in other words, they can come closer to the respective application or smoothing roller independently. This capacity for independent movement makes it possible to provide an optimised uniform or smooth coating, since it enables the applied coating to be made uniform or smoothed by adjusting said uniformity or smoothing independently from said applied coating.

Preferably, the application pressure element and/or the smoothing pressure element can be adjustable in the movement thereof. In the context of the invention, adjustable in movement is understood as the pressure element being able to be moved from an initial position to a plurality of selected different end positions, in particular, end positions wherein the pressure element exerts different pressure against the respective application or smoothing roller.

The adjustment of the movement of the pressure element makes it possible to adjust a required uniformity of the coating. In this sense, it is designed so that the pressure element can be moved continuously, enabling the adjustment in movement thereof in a more precise manner and therefore a more precise adjusting of the uniformity of the coating applied to the sheet.

Also preferably, the system may comprise a movement controller in order to control the movement of the application pressure element and/or the smoothing pressure element. In the context of the invention, control of the movement, in particular, of the adjustment of the movement, is understood as the movement being performed according to a programme or instructions memorised by the controller. In this manner, it is possible to simplify or speed up the operation of the system in order to obtain an optimal uniform coating.

Likewise, the control can be performed automatically, for example, by means of the processing by the controller of operating parameters of the system, such as the grammage of the coating product, features of the sheet or of the component parts to be covered with the sheet (for example, porosity of the sheet or of the panel to be glued, thickness of the sheet to be glued, etc.), advance speed or tension of the sheet, advance speed of the component parts, etc. This control can be performed without stopping the system in order to adjust the movement of the pressure elements or even in real time. For example, advantageously, in order to obtain an optimal uniform coating for a higher applied coating grammage it is possible to select a lower pressure of the smoothing pressure element than for a lower coating grammage.

The present invention therefore provides a system for coating a continuous sheet which enables an improved homogeneous smoothing to be obtained, especially for applications of high-gloss, transparent or similar coatings, wherein due to the features thereof they make it possible to easily see application defects, such as gluing defects.

DESCRIPTION OF THE FIGURES

The following figures have been included as part of the explanation of at least one embodiment of the invention.

DETAILED DESCRIPTION OF THE INVENTION

Figure 1:
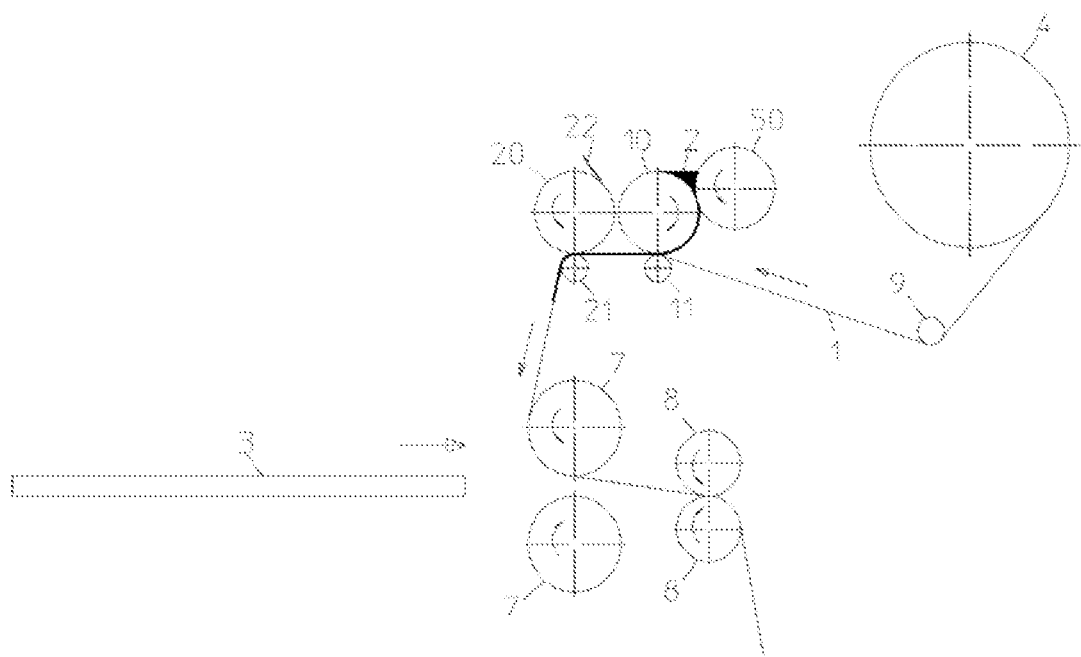
FIG. 1 shows an embodiment of a system for coating a continuous sheet (1) according to the invention, wherein the coating product is a glue (2) which is applied to the sheet (1) in order to cover a panel (3) with the sheet (1).

The present invention relates to a system for applying coatings, such as aesthetic coatings, for component parts of furniture, such as panels or profiles, achieving with this system of the invention features which meet the necessary requirements for the application of high-gloss, transparent or similar coatings.

The application described below uses a glue (2) as a coating product, for example, hot melt glues such as PUR, in particular transparent glues, can be used. Transparent glues are advantageously used to glue transparent sheets, enabling a suitable view of the bottom of the coating.

The system comprises an application head (40) with an application roller (10) and a dosing roller (50). The dosing roller (50) cooperates with the application roller (10) in order to dose an amount of glue (2) onto the application roller (10) by means of the rotation and relative movement of the application (10) and dosing rollers (50). An application pressure element (11) presses the sheet (1) against the application roller (10) such that the glue (2) is applied on the sheet (1).

Once the glue (2) has been applied to the sheet (1), the coating thus obtained is smoothed by means of a smoothing roller (20) arranged after the application roller (10) in the advance direction of the sheet (1). A smoothing pressure element (21) presses the sheet (1) against the smoothing roller (20) in order to smooth the glue coating applied by the application roller (10).

The continuous sheet (1) is fed from a feed reel (4), by means of guide rollers (9), passing between the application roller (10) and the application pressure element (11) and between the smoothing roller (20) and the smoothing pressure element (21).

Figure 3:
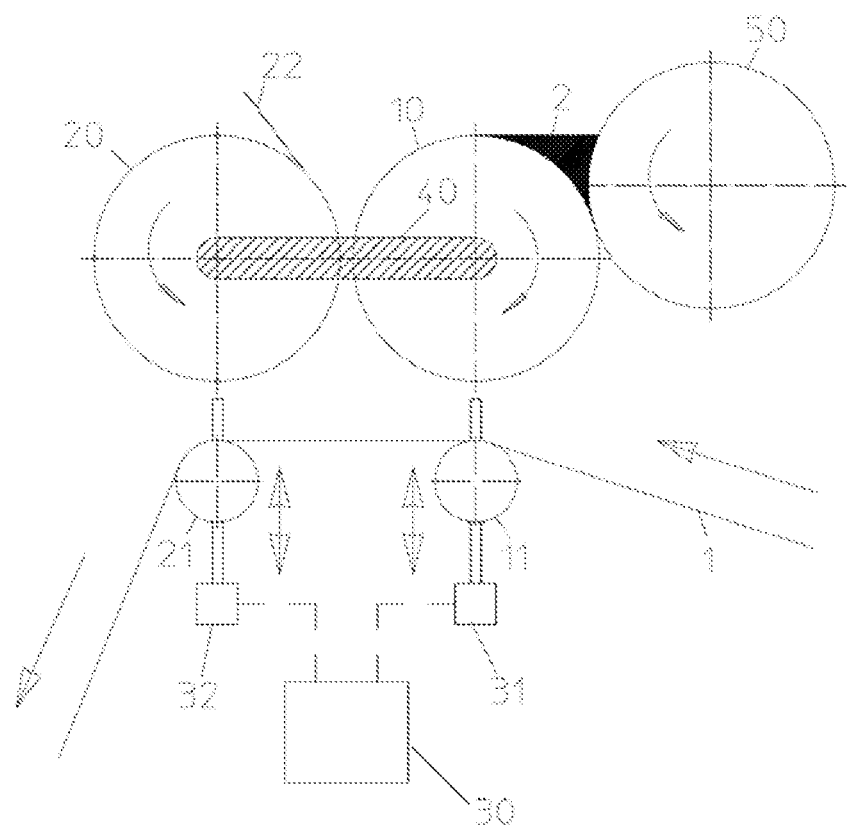
FIG. 3 shows in detail the application roller (10), smoothing roller (20) and respective application (11) and smoothing pressure elements (21), as well as other components of the system for the embodiments of the FIGS. 1 and 2.

The represented embodiment of the application head (40) is not limiting, since the dosing roller (50) and the application roller (10) can also rotate in the same direction, and likewise the contribution of the glue (2) to the application roller (10) can also be by other means, for example, by means of a passage-limiting element, for example, in the form of a blade or scraper, or by means of an edge melter. As shown in FIG. 3, according to the invention it is also designed for the smoothing roller (20) to be able to be fastened to the application head (40) together with the application roller (10) and, if appropriate, the dosing roller (50).

Similarly, the relationship between the application roller (10) and the sheet (1) can be such that the applicator roller (10) rotates in the advance direction of the sheet (1), as shown, or in the opposite direction, without this altering the practical function of the system.

Likewise, the smoothing roller (20) can rotate in the direction opposite from the advance of the sheet, as shown, or in the same direction. The rotation of the smoothing roller (20) makes it possible to prevent a localised wear of the roller, as well as facilitating the removal of the excess coating product from the smoothing, which can be collected by means of an element limiting the passage of the coating product, such as a blade (22).

In the embodiment of the system represented in FIG. 1, after the smoothing, the sheet (1) passes through two successive calendering assemblies comprising respective calendering rollers (7), (8). By means of the calendering, the glued sheet (1) is fastened to the panel (3), covering it, favouring that the joint is completely uniform. The first calendering (7) enables the sheet to be settled on the base part and the second calendering (8) enables the joint to be additionally made uniform.

Figure 2:
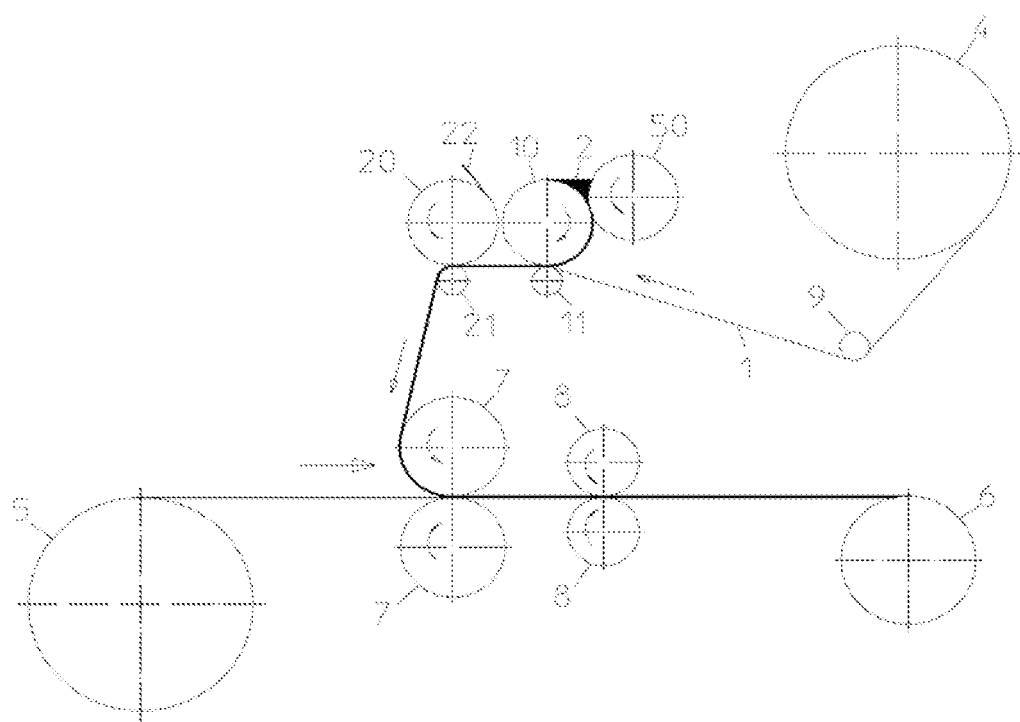
FIG. 2 shows another embodiment of a system for coating a continuous sheet (1) according to the invention, wherein the coating product is a glue (2) which is applied to the sheet (1) for the joining thereof to another continuous sheet.

In the embodiment of the system represented in FIG. 2, after the smoothing, the sheet (1) passes through two successive calendering assemblies comprising respective calendering rollers (7), (8). Unlike the embodiment represented in FIG. 1, by means of the calendering, the glued sheet (1) is fastened to another continuous sheet which is fed from another feed reel (5), likewise favouring that the joint is completely uniform. In the same manner, the first calendering (7) enables the glued sheet to be settled on the other sheet and the second calendering (8) enables the joint to be additionally made uniform. The laminar product resulting from both joined sheets is wound in a collecting reel (6).

In the embodiments represented, the application (11) and smoothing pressure elements (21) take the form of a rotating roller, but this embodiment is not limiting. Different solutions can in turn be used as application (11) or smoothing pressure elements (21), for example a skid, a pneumatic cushion, etc. Advantageously, the rotating rollers enable the friction and localised wear of the sheet with the pressure element to be reduced.

According to the invention, the pressure elements (11), (21) can be interchangeable, being able to be made of different materials and have sizes adaptable to different applications. In particular, it is possible to have pressure elements (11), (21) with different lengths corresponding to different widths of the sheet.

In a preferred embodiment according to the invention, the application (10), dosing (50) and smoothing rollers (20) are metal, which provides greater durability and less maintenance, compared to rollers with rubber coating. More preferably, the metal rollers are heated in order to facilitate the application and smoothing of the coating product, especially in the case of hot melt glues.

In order to move the application or smoothing pressure element an actuator can be used, for example, a linear actuator. FIG. 3 shows an application movement actuator (31), for moving the application pressure element (11), and a smoothing movement actuator (32), for moving the smoothing pressure element (21).

For example, by means of a pneumatic actuator the corresponding pressure element (11), (21) can be moved from an initial position wherein it does not exert pressure on the sheet (1) against the application (10) or smoothing roller (20) to a final position wherein it exerts some pressure on the sheet (1) against said roller (10), (20). For example, by means of a worm screw actuator the pressure element (11), (21) can move in an adjusted and continuous manner to different positions wherein the pressure element (11), (21) exerts different pressures against said roller (10), (20).

FIG. 3 represents a movement controller (30) which acts on the application (31) and smoothing movement actuators (32) for controlling the movement or adjustment of the application (11) and smoothing pressure elements (21).

Figure 4A:
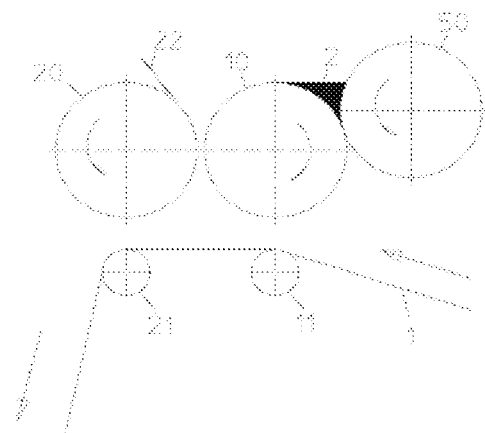
FIGS. 4a, 4b and 4c show successive steps of an example of operation of the system for the embodiments of FIGS. 1 to 3.
Figure 4B:
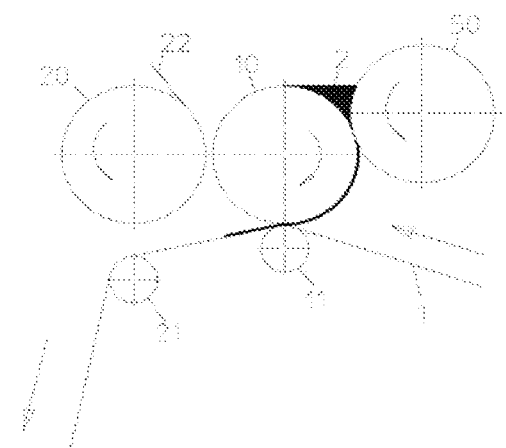
Figure 4C:
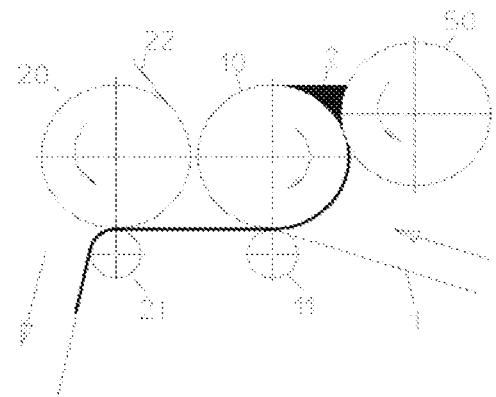

In an exemplary embodiment, the movement controller (30) is configured so that the smoothing pressure element (21) starts to press the sheet (1) against the smoothing roller (20) after the application pressure element (11) presses the sheet (1) against the application roller (10). FIGS. 4a, 4b and 4c show the sequence of movements of the pressure elements (11), (21) controlled in this manner. In this manner, it becomes possible to provide a start-up of the system with a smooth transition.

In particular, following the exemplary embodiment of the previous paragraph, the movement controller (30) can be configured so that the smoothing pressure element (21) starts to press the sheet (1) against the smoothing roller (20) when the sheet (1) reaches a constant tension and/or advance speed. In this manner, it is possible to prevent the generation of wrinkles or tensions which can bend the sheet (1).

In another exemplary embodiment, the movement controller (30) is configured to move the smoothing pressure element (21) while maintaining the application pressure element (11) fixed. In this manner, a suitable control of the uniformity of the applied coating is facilitated, being able to exclusively vary the movement of the smoothing pressure element in order to adapt the pressure which it exerts on the sheet (1) against the smoothing roller (20).

The invention claimed is:

1. A system for coating a continuous sheet, comprising
an application roller for applying a coating on the sheet when the sheet is pressed against the application roller by an application pressure element,
a smoothing roller for smoothing the coating applied on the sheet by contact of the smoothing roller with the coating when the sheet is pressed against the smoothing roller by a smoothing pressure element,
the application and smoothing pressure elements being independently movable in order to press the sheet.

2. The system for coating a continuous sheet, according to claim 1, wherein the application pressure element and/or the smoothing pressure element are adjustable in the movement thereof.

3. The system for coating a continuous sheet according to claim 1, further comprising a movement controller for controlling the movement of the application pressure element and/or of the smoothing pressure element.

4. The system for coating a continuous sheet according to claim 3, wherein the movement controller is configured so that the smoothing pressure element starts to press the sheet against the smoothing roller after the application pressure element presses the sheet against the application roller.

5. The system for coating a continuous sheet, according to claim 4, wherein the movement controller is configured so that the smoothing pressure element starts to press the sheet against the smoothing roller when the sheet reaches a constant tension and/or advance speed.

6. The system for coating a continuous sheet according to claim 3, wherein the movement controller is configured to move the smoothing pressure element while maintaining the application pressure element fixed.

7. The system for coating a continuous sheet according to claim 1, further comprising an application head to which the application roller and the smoothing roller are fastened.

* * * * *